US008688558B2

(12) United States Patent
Chadwick

(10) Patent No.: US 8,688,558 B2
(45) Date of Patent: Apr. 1, 2014

(54) SYSTEM AND METHOD FOR ANALYZING DATA ASSOCIATED WITH STATISTICAL ARBITRAGE

(75) Inventor: Stephen Chadwick, New York, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 232 days.

(21) Appl. No.: 13/079,430

(22) Filed: Apr. 4, 2011

(65) Prior Publication Data

US 2011/0178958 A1 Jul. 21, 2011

Related U.S. Application Data

(62) Division of application No. 11/981,060, filed on Oct. 30, 2007, now Pat. No. 7,921,050.

(60) Provisional application No. 60/855,307, filed on Oct. 30, 2006.

(51) Int. Cl.
*G06Q 40/00* (2012.01)

(52) U.S. Cl.
USPC .............................. 705/36 R; 705/37; 705/35

(58) Field of Classification Search
USPC ............................................ 705/35, 36 R, 37
See application file for complete search history.

(56) References Cited

U.S. PATENT DOCUMENTS

| | | | |
|---|---|---|---|
| 5,787,402 | A | 7/1998 | Potter et al. |
| 6,952,683 | B1 | 10/2005 | Gerhard |
| 7,024,378 | B2 | 4/2006 | Razumov |
| 7,243,083 | B2 | 7/2007 | Burns et al. |
| 2002/0087455 | A1 | 7/2002 | Tsgarakis et al. |
| 2003/0130929 | A1* | 7/2003 | Waddell ........................ 705/37 |
| 2004/0267655 | A1* | 12/2004 | Davidowitz et al. ........... 705/37 |
| 2008/0195556 | A1 | 8/2008 | Vioni |

OTHER PUBLICATIONS

Transaction-Cost-Conscious Pairs Trading via Approximate Dynamic Programming Undergraduate Honors Thesis Department of Computer Science; Stanford University; Xiang Yan; Jun. 1, 2006.*
Pricing and hedging spread options; Author(s): Carmona, R.; Durrelman, V. Affiliation(s); Dept. of Oper. Res. & Financial Eng., Princeton Univ., NJ, USA Journal: SIAM Review, vol. 45, No. 4, pp. 627-685.
FlexTrade Unveils Fast Simulator for Rapid Testing of Portfolio Trading Strategies Using Tick Data; Flex TRADER Hedge Fund Client Points to Fast Simulator's Efficacy in Minimizing Transaction Cots and Slippage. (May 2, 2005). Business Wire, 1.
Ines Fortin & Christoph Kuzmics. (2002). Tail-dependence in stock-return pairs. International Journal of Intelligent Systems in Accounting, Finance and Management, 11(2), 89.

* cited by examiner

*Primary Examiner* — Alexander Kalinowski
*Assistant Examiner* — Abhishek Vyas
(74) *Attorney, Agent, or Firm* — King & Spalding

(57) ABSTRACT

Providing computer-based systems and methods for analyzing historical performance of financial securities and identifying trades in those securities based on the securities' current position as compared to this historical performance. These computer-based systems and computer-implemented methods include identifying stock pairs to include in a trading portfolio, based on a measure of the pair's relative performance, such as a modified Sharpe Ratio. The value of the stocks in each stock pair in the portfolio is assessed and deviations determined. This assessment can occur daily or at a longer or shorter time step. Stocks are bought or sold based on the current price of the stock as compared to historical performance. The present invention preferably employs a large number of stock pairs in the trading portfolio. This use of a large number of pairs results in a plurality of stocks being in more than one stock pair.

10 Claims, 6 Drawing Sheets

300

SYSTEM AND METHOD FOR ANALYZING DATA ASSOCIATED WITH STATISTICAL ARBITRAGE

RELATED APPLICATIONS

The patent application is a divisional of U.S. patent application Ser. No. 11/981,060 entitled "System and Method for Analyzing Data Associated with Statistical Arbitrage," filed Oct. 30, 2007 (now U.S. Pat. No. 7,630,992), which claims priority under 35 U.S.C. §119 to U.S. Provisional Patent Application No. 60/855,307, entitled System and Method for Analyzing Data Associated with Statistical Arbitrage, filed Oct. 30, 2006, the complete disclosure of which is hereby fully incorporated herein by reference.

FIELD OF THE INVENTION

This invention relates to systems and methods for analyzing data associated with statistical arbitrage. More particularly, this invention relates to providing the computer infrastructure and electronic processes for analyzing historical performance of financial securities and identifying trades in those securities based on current price and the historical performance.

BACKGROUND OF THE INVENTION

The securities markets produce a vast amount of data. These data record the price history of individual securities in these markets. Statistical arbitrage attempts to take advantage of this vast amount of data to analyze trends and other relationships in the price of securities and employ trading strategies that take advantage of these trends and relationships. The term statistical arbitrage describes a broad family of trading strategies that seek to profit from historically observed relationships between stocks or other securities.

A common type of statistical arbitrage works by trading correlated stock pairs against each other. This type of statistical arbitrage works on the principle that, if one stock in the correlated pair moves significantly in price without a comparable move in the other, the spread in the price of this stock pair will revert to its usual relationship. That is, either the underperforming stock will rise, or the outperforming stock will sell off to return the stocks to their appropriate relative valuation, or "spread." The statistical arbitrage trading model shorts the outperforming stock and buys the weak name to profit if the price spread returns to its normal level. The trigger for trading on the stock pair comes from historical price data only. By contrast, a typical long/short pair reflects an investor's belief in changing relative values for two stocks in a sector, while a risk (merger) arbitrage pairs trade relies on the expectation of an upcoming event to move the spread. These approaches have used a small number of pairs to trade.

Other types of statistical arbitrage besides mean-reverting pairs exist, such as technical, or "black box," trading systems, which also attempt to spot recurring trading patterns and trade around them, generating gains when historical price patterns reassert themselves. Whatever the underlying pattern sought, the expected edge in a statistical arbitrage trade is small.

One of the biggest problems in statistical arbitrage of any sort is the risk of "data mining," that is, the risk that, if you manipulate the data enough, it will support any premise. Data mining occurs when a supposed relationship is "discovered" in the historical data that is actually just the result of chance. Given enough data or enough flexibility in what one calls a pattern, the probability is very high that something interesting will be found. But this "discovery" does not necessarily mean that the relationship has any true meaning, or, more importantly, that the pattern will recur in the future.

In view of the foregoing, there is a need for systems and methods for analyzing historical performance of financial securities and identifying trades in those securities based on the securities' current position as compared to this historical performance.

DETAILED DESCRIPTION OF THE EXEMPLARY EMBODIMENTS

Exemplary embodiments of the present invention provide systems and methods for analyzing historical performance of financial securities and identifying trades in those securities based on the securities' current position as compared to this historical performance. These computer-based systems and computer-implemented methods include identifying stock pairs to include in a trading portfolio, based on a measure of the pair's relative performance. The exact number of pairs or percentage of pairs to the overall number of stocks in the set will vary with the set of securities being analyzed. Preferably, the statistical arbitrage portfolio has a large number of stock pairs to offset chance correlations between stock pairs and to realize returns through implementing a large number of trades. The value of the stocks in each stock pair in the portfolio is assessed and deviations determined. This assessment can occur daily or at a longer or shorter time step. Stocks are bought or sold based on the current price of the stock as compared to historical performance. The present invention preferably employs a large number of stock pairs in the trading portfolio. This use of a large number of pairs results in a plurality of stocks being in more than one stock pair.

Figure 1:
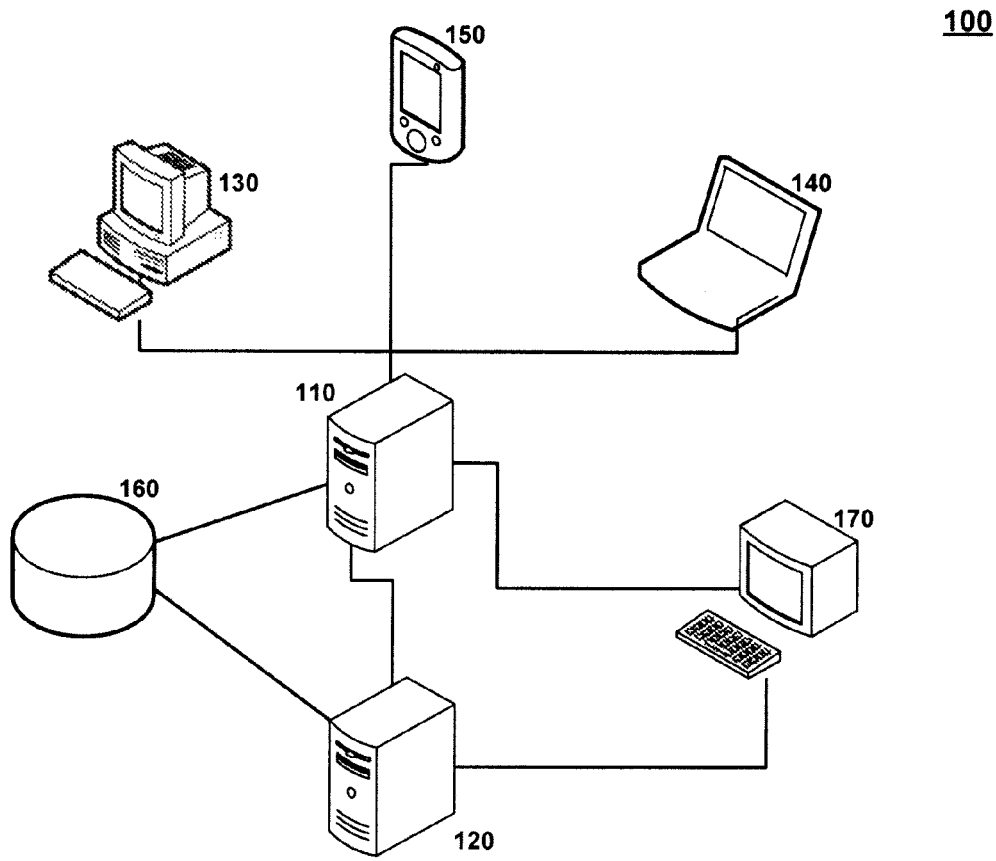
FIG. 1 depicts an operating environment in accordance with an exemplary embodiment of the present invention.

FIG. 1 depicts an operating environment 100 in accordance with an exemplary embodiment of the present invention. Referring to FIG. 1, a statistical arbitrage server 110 hosts software used to identify stock pairs for a portfolio of stocks used for statistical arbitrage. The arbitrage server 110 is connected to one or more trading servers, such as trading server 120. Trading server 120 initiates trades in securities, such as stocks in the statistical arbitrage portfolio. The arbitrage server 110 is accessible by a variety of client devices, such as personal computer 130, laptop 140, and personal data assistant 150. Users can use one of these client devices to access the statistical arbitrage software on the arbitrage server 110. These client devices may include client software used to access the statistical arbitrage software. The client software may be a thin client, such as a web browser, or a more robust, application-specific client software program.

The arbitrage server 110 accesses a data store 160. The data store 160 includes historical data regarding securities valuations and characteristics of the securities that make up the statistical arbitrage portfolio. The data store 160 may also be connected to the trading server 120, which updates the data store 160 with information on securities valuation. Additionally, the arbitrage server 110 and the trading server 120 may be accessed and controlled through one or more terminals, such as terminal 170. One of ordinary skill in the art would appreciate that a variety of computer network configurations can be employed to support the statistical arbitrage systems and methods in accordance with the present invention. For example, the trading server 120 can be an entire network of computers used to trade securities and collect information on the day-to-day or even minute-to-minute value of securities. Also, the arbitrage server 110 could reside on a local area network that includes personal computer 130, laptop 140, and personal data assistant 150, such that the arbitrage server 110 is accessed and controlled through these client devices. Also, the database 160 may be a distributed database, with multiple databases containing securities information.

Figure 2:
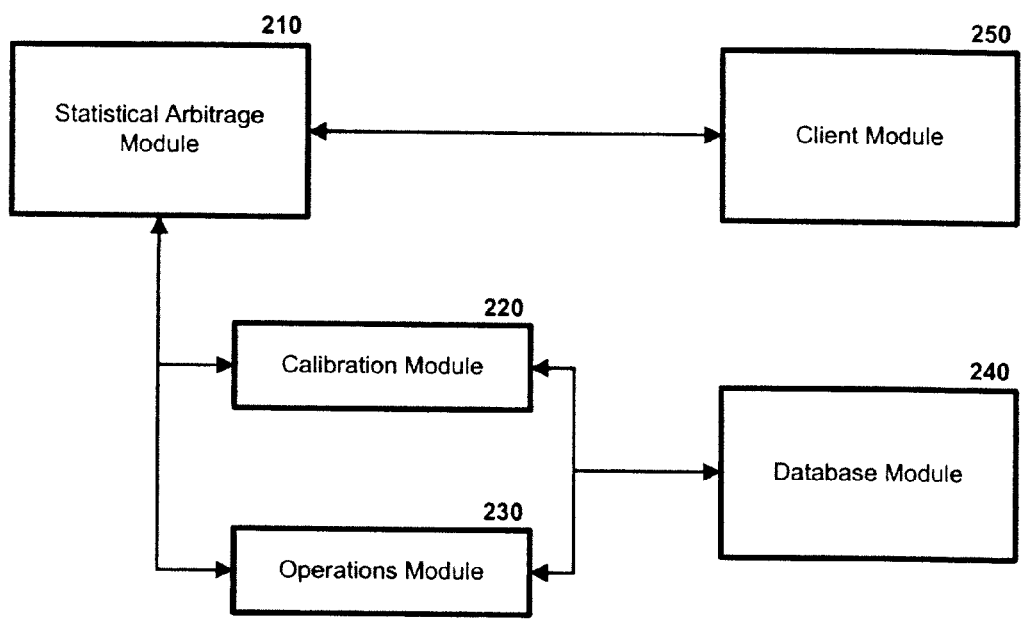
FIG. 2 depicts a software architecture in accordance with an exemplary embodiment of the present invention.

FIG. 2 depicts a software architecture 200 in accordance with an exemplary embodiment of the present invention. Referring to FIGS. 1 and 2, a statistical arbitrage module 210, which may reside on the arbitrage server 110, includes two sub modules. A calibration module 220 identifies stock pairs to form a statistical arbitrage portfolio. The calibration module 220 evaluates each possible stock pair in a given set of stocks, or other securities, and identifies correlated pairs for the portfolio. For example, out of the stocks in the Standard and Poor's (S&P) 500, 124,750 possible pairs exist, with the calibration module 220 selecting approximately 26,000 pairs for the statistical arbitrage portfolio. The exact number of pairs or percentage of pairs to the overall number of stocks in the set will vary with the set of securities being analyzed. Preferably, the statistical arbitrage portfolio has a large number of stock pairs to offset chance correlations between stock pairs and to realize returns through implementing a large number of trades.

Additionally, the calibration module 220 may identify a reversion period for each selected pair. In one embodiment, the calibration module 220 evaluates the performance of each pair based on historical data for discrete reversion periods to determine which period is best for the selected pair, that is, over what period of time does the stock pair revert to an expected relative performance. In an alternative embodiment, the calibration module 220 may employ Fourier transforms to identify the cyclic nature of the relative performance of each stock pair to identify a reversion period.

An operations module 230 calculates the current deviation for each stock pair that made it into the statistical arbitrage portfolio, netting out all the buys and sells to provide a target position list each day (or other time step). One stock may be in a number of different pairs. That is, a single stock is not in just one stock pair—it may be a member of a large number of pairs. On any given trading day, the analysis may result in selling the stock based on the evaluation of one pair and buying the stock based on the result of analyzing a second pair with that same stock. The operations module 230 offsets these buys and sells to identify the net action for a stock. For example, Slumberger, an oil and gas services company, may be paired with Bears Sterns Companies in one stock pair, American Express in another stock pair, and American International Group (AIG) in a third pair. Analysis of the Slumberger-Bears Sterns pair and the Slumberger-American Express pair may both result in a "sell" of Slumberger stock while analysis of the Slumberger-AIG pair may result in a "buy" of the Slumberger stock. The operations module 230 would take the magnitude of the two "sell" results and the one "buy" result to determine the net number of shares to sell or buy. For example, two "sell" results of 150 shares each netted against a "buy" of 100 shares results in a net sell of 200 shares (150+150−100). Alternatively, two "sells" of 150 shares each netted against a "buy" of 400 shares results in a net buy of 100 shares (150+150−400).

The calibration module 220 and the operations module 230 interact with a database module 240. This database module 240 interacts with the data store 160 to access historical data on stocks in the stock set of interest and other data to support operations of the statistical arbitrage system. The architecture 200 may also include a client 250. The client 250 allows a user to access the statistical arbitrage module 210. The client 250 may be a thin client, such as a browser, or a robust client, specifically created to interact with the statistical arbitrage module 210.

Figure 3:
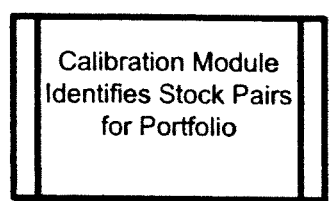
FIG. 3 depicts an overall process flow for analyzing historical performance of financial securities and identifying trades in those securities in accordance with an exemplary embodiment of the present invention.
Figure 3:
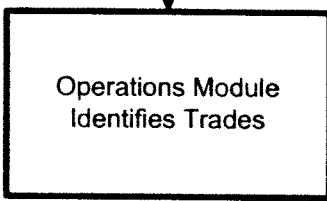

FIG. 3 depicts an overall process flow 300 for analyzing historical performance of financial securities and identifying trades in those securities in accordance with an exemplary embodiment of the present invention. Referring to FIGS. 2 and 3, at step 310, the calibration module 220 identifies stock pairs for a portfolio. This step is discussed in greater detail below, in connection with FIG. 4.

In this exemplary embodiment, the frequency for step 310 depends on the temporal characteristic of the historical database used by the calibration module 220 and the volatility of the securities market involved. For example, step 310 may be based on 2-3 years of historical data. In that case, a single week of data may represent less than one percent of the total data evaluated at step 310. As such, performing step 310 weekly, or even bi-weekly, may be adequate to update the stock pairings in that case. In alternative embodiments, step 310 may be performed more or less frequently. For example, the total data considered by the calibration module 220 may be based on a short period of time, such as one to two weeks, and step 310 may be performed daily.

At step 320, the operations module 230 identifies trades. This processes step is discussed in greater detail below, in connection with FIGS. 5 and 6. In this exemplary embodiment, step 320 would be performed for every trading day, that is, every day the market covered by the portfolio is open. One of ordinary skill in the art would appreciate that the frequency of this step is implementation-specific. In one embodiment, this step may be performed over a short period of time, such as a matter of seconds. In an alternative embodiment, this step may be performed every few days or even every few weeks.

Figure 4:
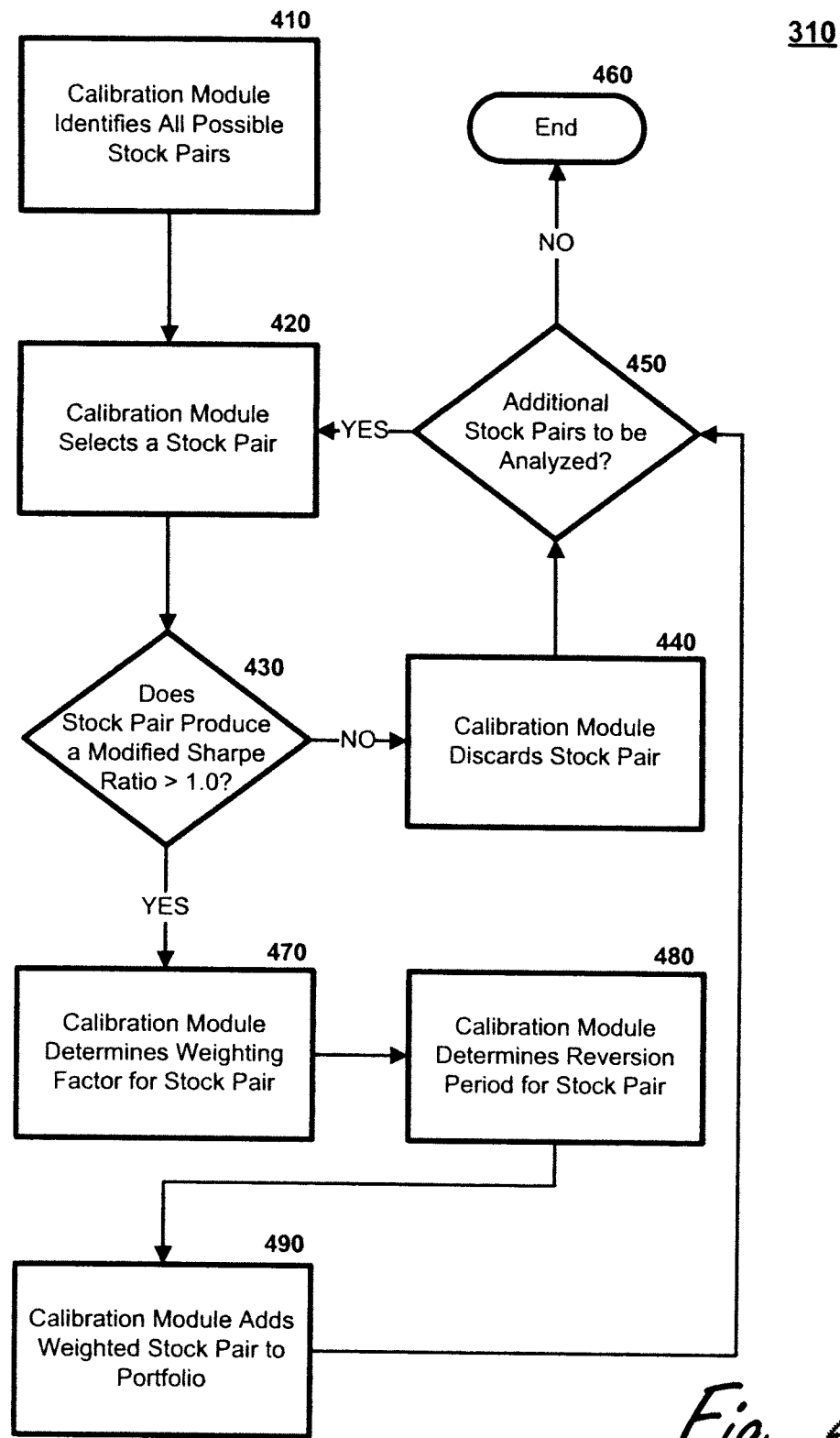
FIG. 4 depicts a process flow for identifying stock pairs for a portfolio used in statistical arbitrage in accordance with an exemplary embodiment of the present invention.

FIG. 4 depicts a process flow 310 for identifying stock pairs for a portfolio used in statistical arbitrage in accordance with an exemplary embodiment of the present invention. Referring to FIGS. 1, 2, and 4, at step 410, the calibration module 220 identifies all possible stock pairs within a set of stocks. A stock pair is a combination of two stocks within a larger grouping of stocks. This grouping may be stocks within a single stock exchange, such as the New York Stock Exchange, or within an index, such as the S&P 500 or the Dow Jones Industrial Average. For the S&P 500, almost 125,000 stock pairs may be formed.

At step 420, the calibration module 220 selects a stock pair. This selection is made from the pairs identified at step 410. In an exemplary embodiment, the set of stock selected at step 420 may be further screened to focus the portfolio and to remove spurious pairs. For example, pairs may be limited to the same Global Industry Classification Standard (GICS)

industry or pairs may be limited to those pairs with a sixmonth daily price correlation greater than a certain value, such as 0.3.

At step 430, the calibration module 220 calculates a performance measure similar to the Sharpe Ratio (a "modified Sharpe Ratio) for the stock pair. One skilled in the art would be familiar with the Sharpe Ratio. The Sharpe Ratio, as used in this exemplary embodiment, is the expected excess return from a trading strategy divided by the volatility of those returns. One skilled in the art would appreciate that other performance measures, such as Treynor's or Graham-Harvey could be used as a discriminator of stock pairs. Alternatively, observed raw P&L, that is, P&L not adjusted for volatility of returns, may be used. One difficulty in long/short trades of this type is determining the amount of funds invested in order to calculate a "return" on investment. One solution to this difficulty is to use the ratio of the total dollar return of a trade over a period of time to the standard deviation of the daily changes, which is the modified Sharpe Ratio used in this exemplary embodiment.

If the modified Sharpe Ratio is not greater than 1.0, then the stock pair is discarded at step 440, that is, the stock pair is not included in the statistical arbitrage portfolio. One of ordinary skill in the art would appreciate that a different value from 1.0 could be used and the value that is used may be adjusted from time to time based on market results. The process then moves to step 450, where the calibration module 220 determines if additional stock pairs need to be analyzed. That is, the calibration module 220 determines whether any stock pairs identified at step 410 have not been analyzed at step 430. If the answer is "YES," the process 310 returns to step 420 and another stock pair is selected by the calibration module 220. If the answer is "NO," all stock pairs have been analyzed and the process moves to step 460 and terminates.

If, at step 430, the calibration module 220 determines that the modified Sharpe Ratio is greater than 1.0, the process moves to step 270, where a weighting factor for the stock pair is determined. The invention would still be expected to generate positive returns even if the weighting factors are all set to 1, but weighting each pair according to its historical performance is expected to increase returns by concentrating trading activity in the best-performing pairs. For example, stock pairs with a higher modified Sharpe Ratio, as determined at step 430, would have a higher weighting factor than stock pairs with a lower Sharpe Ratio. One of ordinary skill in the art would appreciate that the weight may be capped for any particular pair so as to not skew the portfolio toward a few outliers that happened to have spectacular historical results. Also, in an alternative embodiment, the process 310 may limit the number of pairs that can be associated with any given stock to avoid over-concentration of the portfolio in that stock.

In an exemplary embodiment, each stock pair is weighted by its calculated Sharpe ratio squared. This weighting factor is then adjusted by a multiplier, which represents a sector factor. For example, for the S&P 500, the multipliers, or sector factors, used are "6" for stock pairs where both stocks are within the same industry group, as reported by Bloomberg, or "4" for those stock pairs where both stocks are within the same industry sector, but not the same group. Examples of industry groups are "software," "pharmaceuticals," "retail," and "semiconductors." Stocks within the "software" and "semiconductor" industry groups would be in the "technology" industry sector while stocks in the "telecom" group would be in the "communications" sector. Stock pairs from different sectors entirely may still get high weights if their Sharpe Ratios are high, but these pairs are given a "1" multiplier only, because of the large probability that the pairs arise only from chance.

At step 480, the calibration module 220 identifies the reversion period for the selected stock pair. In this exemplary embodiment, the calibration module 220 evaluates the relative performance of the stock pair over a range of time periods to determine the time period for which the stock pair reverts to an expected relative performance. In an alternative performance, the calibration module 220 may employ mathematical evaluations of the historical data, such as Fourier transforms, to identify the reversion period for each stock pair.

At step 490, the calibration module 220 adds the stock pair to the statistical arbitrage portfolio. The process then moves to step 450, where the calibration module 220 determines if additional stock pairs need to be analyzed. If the answer is "YES," the process returns to step 420 and another stock pair is selected. If the answer is "NO," the process moves to step 460 and terminates. Once terminated, the portfolio developed by the process contains the stock pairs used in the statistical arbitrage operation.

As discussed above, process 310 is implemented based on a desired frequency for updating the statistical arbitrage portfolio and this frequency may be based on the amount of data analyzed by the calibration module 220 and the volatility of the market of interest. When the process is rerun to update the portfolio, the portfolio is completely emptied before the operation is rerun. That is, the process starts anew and all previously selected stock pairs are removed from the portfolio and reanalyzed. While it is likely that many of these pairs will be selected again, others may not. Also, even for those stock pairs selected again, the Sharpe Ratios for the pairs may change because of the new data introduced since the last time the calibration module 220 was run, resulting in a different weighting factor for the pair.

During the calibration process, the calibration module 220, resident on a server, such as arbitrage server 110, accesses historical data from a database, such as a database at data store 160. Prior to rerunning the calibration module 220 to update the statistical arbitrage portfolio, the database would receive updated historical data, typically reflecting the performance of the securities in the market of interest since the last time the calibration module 220 was run.

According to an exemplary embodiment of the present invention the statistical arbitrage process identifies a large number of stock pairs for its statistical arbitrage portfolio. A result of this large number of stock pairs is that a single stock may be a member of multiple stock pairs. Preferably, at least fifty percent (50%) of the stocks in the statistical arbitrage portfolio is a member of more than one stock pair.

Figure 5:
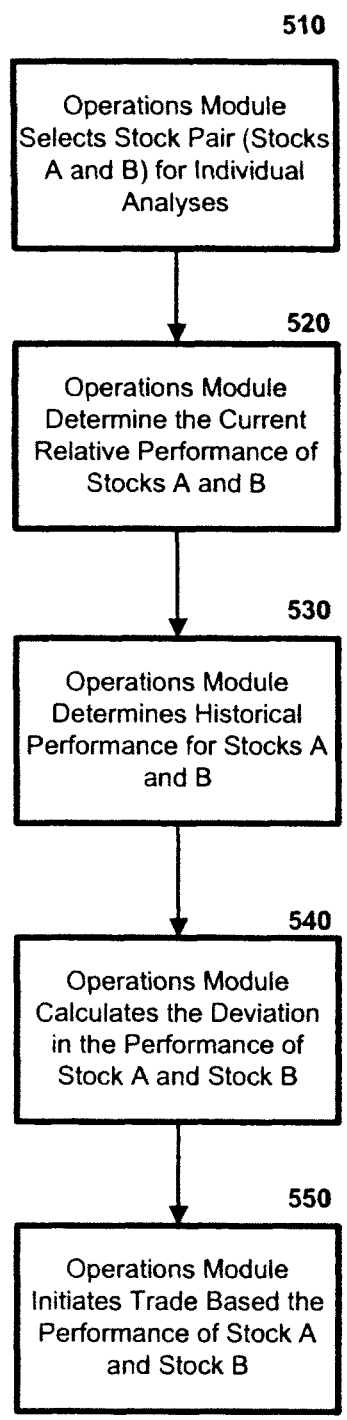
FIG. 5 depicts a process flow for evaluating a trade based on a stock pair in accordance with an exemplary embodiment of the present invention.

FIG. 5 depicts a process flow 500 for evaluating a trade based on a stock pair in accordance with an exemplary embodiment of the present invention. The process 500 reflects one possible operational sequence for the statistical arbitrage module 210 and the operations module 230. Referring to FIGS. 1, 2, 3, and 4, at step 510, the operations module 230 selects a stock pair from the portfolio generated by process 310. The stock pairs and other information that supports the statistical arbitrage operations would typically be stored in a database, such as a database in data store 160.

At step 520, the operations module 230 determines the relative performance of the stock pair at the current time, that is, at the time step that the operations module 230 is run. At step 530, the operations module 230 determines a "historical performance" for the stock pair. In an exemplary embodiment, this historical performance may represent the relative performance of the stock pair at a fixed point in the past. For example, the historical performance may be based on the relative performance of the stock pair 20 minutes in the past, that is, the relative performance of the stock pair at that single moment. Also, step 530 may determine "historical performance" at different times for different stock pairs. So, for one stock pair, the historical performance may be measured 20 minutes in the past while for another pair, the historical performance may be measured 1 day in the past. This time may equal a reversion time calculated by the calibration module 220 for each stock pair. Regardless of the reversion time used, the historical performance represents the relative performance of the stock pair at a single point in the past in this embodiment. In an alternative embodiment, the "historical performance" may be based on the average relative performance of the pair over a period of time, such as the past week or past month. In this embodiment, the historical performance may be the average of the daily relative performances of the stock pair over the time period. Again, the historical performance for different stock pairs may be based on different periods of time.

At step 540, the operations module 230 calculates the deviation in the current relative performance for the stock pair, as calculated at step 520 as compared to the historical performance calculated at step 530. At step 550, the operations module 230 initiates a trade of the stock pair, based on the calculated deviation. This deviation would be an indication of how far the stock pair is away from its target relative performance. The process flow 500 would be repeated for the stock pairs in the portfolio.

According to this exemplary embodiment of the present invention, step 550 does not employ a threshold in the deviation calculated at step 540 to trigger a trade in the stocks in the stock pair. Step 550 initiates a trade regardless of the magnitude of the deviation.

One of ordinary skill in the art would appreciate that this initiated trade could be based on the magnitude of the deviation calculated at step 540, that is, the magnitude of the deviation would be a scaling factor for the volume of shares traded. For example, a calculated deviation of 20 could result in a trade of four times as many shares as compared to a trade initiated by a calculated deviation of 5. A weighting factor or other factor may be used to modify the magnitude of the trade as well. Alternatively, a curve function may be applied to the raw deviation signal to avoid overloading into stocks that move very rapidly. For example, the operations module 230 may take the square root of the raw signal, while maintaining the direction of the signal (gain (+) or loss (−)). The operations module 230 may allow the signal to decline beyond some point, representing the point where reversion is no longer expected to occur. For example, a downward parabola function would reach an apex at some signal, then start to decline as the signal continues to gain in strength.

Also, the process 500 could be repeated for steps 510 through 540 for all stock pairs in the portfolio, then step 550 would initiate net trades based on the evaluation of all of the stock pairs.

Figure 6:
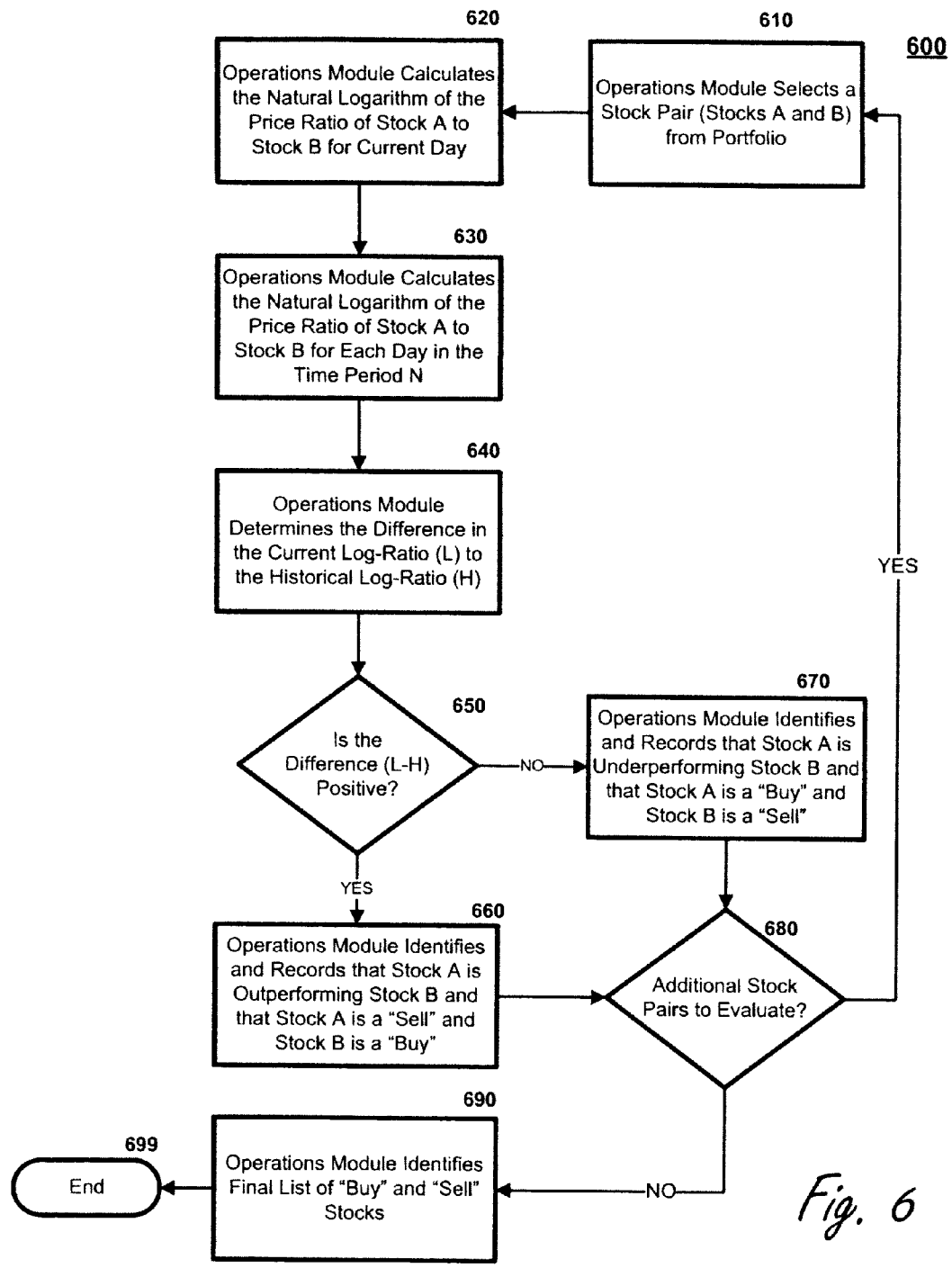
FIG. 6 depicts a process flow for evaluating a trade based on a stock pair in accordance with an exemplary embodiment of the present invention.

FIG. 6 depicts a process flow 600 for evaluating a trade based on a stock pair in accordance with an exemplary embodiment of the present invention. The process 600 reflects one possible operational sequence for the statistical arbitrage module 210 and the operations module 230. Referring to FIGS. 1, 2, 3, and 4, at step 610, the operations module 230 selects a stock pair from the portfolio generated by process 310. For ease of description, the stock pair includes Stock A and Stock B. The stock pairs and other information that supports the statistical arbitrage operations would typically be stored in a database, such as a database in data store 160.

At step 620, the operations module 230 determines the current "log-ratio" for the selected stock pair. The log-ratio is the natural logarithm of the ratio of the price of the two stocks in the stock pair. As one example, the stock pair is made up of Stock A, currently trading at $20, and Stock B, currently trading at $10. The log-ratio (which we will call L) of Stock A to Stock B today is ln($20/$10)=0.6931. One of ordinary skill in the art would appreciate that a longer time step, such as weekly, or a shorter time step, such as every minute, could also be used. Also, one of ordinary skill in the art would appreciate that the log-ratio represents just one type of reversion process and that other reversion processes may be used at step 620 without departing from the present invention.

In step 630, the operations module 230 calculates the log-ratio for each day in the last N days and takes the average of these values as the historical log-ratio, H. At step 640, the operations module 230 determines the difference in the current log-ratio to the historical log-ratio; that is, L−H.

At step 650, the operations module 230 determines if the deviation (L−H) determined at step 640 is positive or negative. If the deviation is positive, the process moves to step 660, and the operations module 230 identifies and records Stock A (that is, the stock used as the numerator in the log-ratio calculation) as a "Sell" and Stock B as a "Buy." Using the example above, if the historical log-ratio over D periods is 0.7500, the deviation would be 0.7500−0.6931=0.0569. This deviation is a positive deviation, indicating that Stock A has outperformed Stock B, and therefore Stock A is a sell and Stock B a buy. If the difference determined at step 650 is negative, the reverse applies: Stock A is a buy and stock B a sell, as seen in step 670.

The number of shares traded in each stock on each rebalance is selected in such a way that the value of the buy (long) side is equal to the value of the sell (short) side. Alternatively, the trading sizes may be set to have equal "beta," according to well-known long-short trading practice, but the present invention is expected to work equally well without this added complexity.

The notional value of each leg, long and short, may be set in a proportional way to the amount of deviation calculated in step 650. A pair with a deviation of 1.0 would therefore be traded in half the size (by value, not necessarily by the number of shares) as a pair with a deviation of 2.0. The multiplier used to convert log-ratio deviation to an actual dollar (or other currency) value is selected by the user and may depend on the amount of capital and risk to be invested in the strategy.

After either step 660 or step 670, the process moves to step 680 and the operations module 230 determines if additional stock pairs exist in the portfolio to be evaluated. If the answer is "YES," the process returns to step 610 and repeats. If the answer is "NO," the process moves to step 690 and identifies the final list of "Buy" and "Sell" stock. A certain stock, such as Stock A, may be in a number of stock pairs in the portfolio—paired with Stock B in one pair and paired with Stock C in another pair, for example. The evaluation of stock pairs with Stock A may yield Stock A as a "Buy" in one case and a "Sell" in another. At step 690, the operations module 230 determines the total amount of Stock A to be traded, which would be the sum of the amounts calculated for each individual pair (some as buys and some as sells).

After the final list is developed, the process moves to step 699 and ends. In the exemplary embodiment, the process 600 would be run daily (i.e. daily rebalances). One skilled in the art would appreciate that the process could be run at other time intervals, such as weekly. In that case, the spread of current log-price ratio to historical log-price ratio used in step 630 may be based on an average price spread over the selected time period, such as a week. Alternatively, the process 600 may run very frequently, such as on the order of seconds or minutes.

The use of log price ratios ensures that the strategy is symmetrical and self-scaling: i.e. the method is not sensitive on which stock is "A" and which stock is "B," and the method is not sensitive if one stock costs $90,000 a share and the other stock is a penny stock.

One of ordinary skill in the art would appreciate that the present invention provides systems and methods for analyzing historical performance of financial securities and identifying trades in those securities based on the securities' current position as compared to this historical performance. These computer-based systems and computer-implemented methods include identifying stock pairs to include in a trading portfolio, based on a measure of the pair's relative performance, such as a modified Sharpe Ratio. The value of the stocks in each stock pair in the portfolio is assessed and deviations determined. This assessment can occur daily or at a longer or shorter time step. Stocks are bought or sold based on the current price of the stock as compared to historical performance. The present invention preferably employs a large number of stock pairs in the trading portfolio. This use of a large number of pairs results in a plurality of stocks being in more than one stock pair.

What is claimed is:

1. A method for identifying trades for a statistical arbitrage program, comprising:
   determining, by at least one processor, a first relative performance of a stock pair at a current time;
   determining, by the at least one processor, a historical time during which the stock pair reverts to an expected relative performance according to a cyclic performance between the stock pair;
   determining, by the at least one processor, a second relative performance of the stock pair based on the historical time;
   calculating, by the at least one processor, a deviation in the first relative performance and the second relative performance;
   repeating the determining and the calculating for each stock pair of a plurality of stock pairs;
   calculating a volume of shares to trade based on the calculated deviation; and
   initiating a number of trades of a stock comprising one of the stocks of the plurality of stock pairs based on the calculated volume of shares and one or more of a weighting factor and a deviation curve function.

2. The method of claim 1,
   wherein calculating the volume of shares to trade further comprises calculating according to a scaling factor.

3. The method of claim 1, wherein the historical time comprises a range of time in the past.

4. A method for identifying trades for a statistical arbitrage program, comprising, for each stock pair in a portfolio:
   calculating, by at least one processor, a natural logarithm of a price ratio of a first stock of the stock pair to a second stock of the stock pair at a current time;
   determining, by the at least one processor, an average of a natural logarithm of a price ratio of the first stock of the stock pair to the second stock of the stock pair over a time period prior to the current time;
   determining, by the at least one processor, a difference between the natural logarithm at the current time and the average of the natural logarithm over the time period prior to the current time;
   calculating a volume of shares to trade based on the difference;
   designating, by the at least one processor, one of the stocks in the stock pair as a stock to buy and the other stock in the stock pair as a stock to sell based on the difference; and
   initiating one or more trades based on the designation of the stocks to buy and sell and the volume of shares to trade.

5. The method of claim 4, wherein the designating further comprises designating the first stock of the stock pair as the stock to sell and the second stock of the stock pair as the stock to buy if the difference comprises a positive value.

6. The method of claim 4, wherein the designating further comprises designating the second stock of the stock pair as the stock to sell and the first stock of the stock pair as the stock to buy if the difference comprises a negative value.

7. The method of claim 1, further comprising
   identifying the plurality of stock pairs among a set of stocks; and
   selecting the stock pair among the plurality of stock pairs according to a price correlation of the stocks in the stock pair being greater than a correlation value.

8. The method of claim 1, further comprising calculating a performance measure of a trade of the stock pair according to a ratio of an expected return and a volatility of a trade of the stock pair.

9. A method for identifying trades for a statistical arbitrage program, comprising:
   determining, by at least one processor, a first relative performance of a stock pair at a current time;
   determining, by the at least one processor, a historical time during which the stock pair reverts to an expected relative performance according to a cyclic performance between the stock pair;
   determining, by the at least one processor, a second relative performance of the stock pair based on the historical time;
   calculating, by the at least one processor, a deviation in the first relative performance and the second relative performance;
   calculating a volume of shares to trade based on the calculated deviation; and
   initiating a number of trades comprising a stock of the stock pair based on the calculated volume of shares and one or more of a weighting factor and a deviation curve function.

10. The method of claim 9, further comprising
    calculating the volume of shares to trade according a scaling factor based on the calculated deviation.

* * * * *